A. J. SANFORD.
SWIVEL JOINT.
APPLICATION FILED MAR. 17, 1913.

1,147,553.

Patented July 20, 1915.

WITNESSES.
J. R. Keller
Robert C. Totten

INVENTOR.
Andrew J. Sanford
By Kay & Totten
Attorneys

COLUMBIA PLANOGRAPH CO., WASHINGTON, D. C.

UNITED STATES PATENT OFFICE.

ANDREW J. SANFORD, OF NEWARK, OHIO, ASSIGNOR TO A. H. HEISEY & CO., OF NEWARK, OHIO, A COPARTNERSHIP.

SWIVEL-JOINT.

1,147,553. Specification of Letters Patent. Patented July 20, 1915.

Application filed March 17, 1913. Serial No. 755,060.

*To all whom it may concern:*

Be it known that I, ANDREW J. SANFORD, a citizen of the United States, and resident of Newark, in the county of Licking and State of Ohio, have invented a new and useful Improvement in Swivel-Joints; and I do hereby declare the following to be a full, clear, and exact description thereof.

My invention relates to a swivel joint.

It is often desirable where an article is made in two parts to be able to turn one part with reference to the other to bring a certain configuration on one part in line with the configuration on the other part, such for instance as in a candelabrum formed of glass or other material where the pedestal is fluted and formed in two parts, and it is desirable to have a connection which will permit of the parts being turned so as to bring the flutes or other figures in line with each other on the pedestal.

The object of my invention therefore is to provide a joint which will be adapted for such and other purposes, and it consists, generally stated, in two ferrules or thimbles connected together with a flush joint and rotary the one with the other so that when used under the above conditions the pedestal into which one ferrule fits or the connection above into which the other ferrule fits may be turned to bring the flutes or other figures into register.

Figure 1:
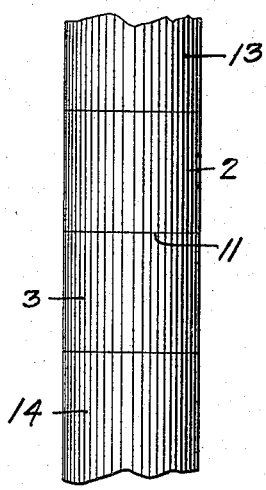
Figure 2:
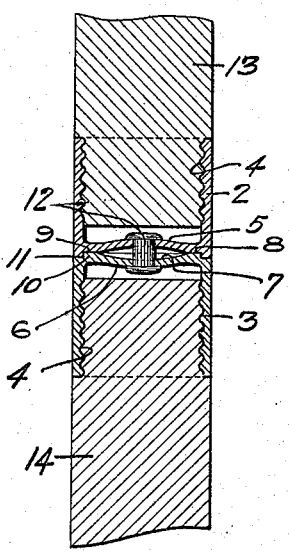

In the accompanying drawing Figure 1 is an exterior view of my improved swivel joint; and Fig. 2 is a longitudinal section of the same.

The swivel joint is made up of the two thimbles or ferrules 2 and 3 which may be formed of any suitable metal, and which are threaded as at 4 on their interior. The bottom plates or webs 5 and 6 of the ferrules 2 and 3, respectively, are slightly dished as at 7, the portions of said bottom plates contiguous to the circumference being in contact as at 8. The ferrule 2 has the flange 9 which engages the annular shoulder 10 on the ferrule 3, so that when the ferrules are brought into close relation the outside edges will abut as at 11 and form a flush joint. To connect the ferrules the rivet 12 is employed and in this way the ferrules are united securely together while at the same time they are rotary one with reference to the other so that when the swivel joint is used to connect two members 13 and 14, the one may be turned with reference to the other.

By dishing the bottoms as illustrated the bottoms only contact at their outer edges and a kind of a tongue and groove joint is formed which permits of one section turning on the other more readily and the rivet passing through these dished portions holds the outer portions of the bottoms more securely in contact and makes a closer joint.

What I claim is:

1. A swivel-joint comprising two ferrules having inwardly dished and resilient bottom-portions, a rivet-member connecting said bottom-portions at the center thereof, and the outer portions of said bottoms held in contact with each other by spring action whereby said ferrule may be rotated one with reference to the other.

2. A swivel-joint comprising two ferrules having inwardly dished and resilient bottom-portions, a rivet-member connecting said bottom-portions at the center thereof, the outer portions of the bottoms being held in contact with each other by spring action, one ferrule having a flange and the other an annular shoulder engaged by said flange, whereby said ferrules may be rotated the one with reference to the other.

In testimony whereof, I the said ANDREW J. SANFORD have hereunto set my hand.

ANDREW J. SANFORD.

Witnesses:
GEO. ELPAESER,
JNO. P. GOODWIN.

Copies of this patent may be obtained for five cents each, by addressing the "Commissioner of Patents, Washington, D. C."